US006672187B2

(12) United States Patent
Alsten et al.

(10) Patent No.: US 6,672,187 B2
(45) Date of Patent: Jan. 6, 2004

(54) METHOD AND APPARATUS FOR RAPID PRECISION CUTTING OF GRAPHICS AREAS FROM SHEETS

(75) Inventors: Peter Alsten, Racine, WI (US); Geo Andersen, Aabyhoej (DK); David G. Jansson, Racine, WI (US)

(73) Assignee: Mikkelsen Graphic Engineering, Inc., Lake Geneva, WI (US)

( * ) Notice: Subject to any disclaimer, the term of this patent is extended or adjusted under 35 U.S.C. 154(b) by 0 days.

(21) Appl. No.: 10/087,626

(22) Filed: Mar. 1, 2002

(65) Prior Publication Data

US 2002/0144579 A1 Oct. 10, 2002

Related U.S. Application Data

(63) Continuation-in-part of application No. 09/951,167, filed on Sep. 13, 2001, which is a continuation-in-part of application No. 09/827,000, filed on Apr. 5, 2001.

(51) Int. Cl.[7] ........................... B26D 5/00; G05B 15/00

(52) U.S. Cl. ....................... 83/13; 83/34; 83/39; 83/75; 83/76.8; 83/365; 83/368; 83/371; 700/134; 700/150; 700/167; 700/259; 347/157

(58) Field of Search .......................... 83/861, 862, 875, 83/879, 880, 881, 13, 22, 32, 34, 39, 52, 56, 72, 73, 74, 75, 75.5, 76.8, 366, 76.9, 365, 368, 371, 901, 936, 940, 747; 700/114, 134, 213, 167, 150, 171, 230, 135, 259; 400/621; 347/157

(56) References Cited

U.S. PATENT DOCUMENTS 3,242,573 A 3/1966 Noel
3,608,799 A 9/1971 Edson
3,803,960 A 4/1974 Pearl et al.
3,805,650 A 4/1974 Pearl
3,838,618 A 10/1974 Eissfeldt et al.
3,848,490 A 11/1974 Arel
3,855,887 A 12/1974 Pearl et al.
3,864,997 A 2/1975 Pearl et al.
4,071,899 A 1/1978 Holy
4,083,095 A 4/1978 Flaum et al.
4,380,944 A 4/1983 Gerber et al.
4,419,913 A 12/1983 Schutt et al.
4,494,435 A 1/1985 Lindsay
4,555,968 A * 12/1985 Raney et al. ................. 83/209
4,583,181 A * 4/1986 Gerber et al. .......... 250/559.46
4,680,083 A 7/1987 Kashiwaba
4,697,485 A 10/1987 Raney
4,704,927 A 11/1987 Hirosawa
4,721,058 A * 1/1988 Hayamizu et al. ............ 118/39
4,768,410 A * 9/1988 Wood ......................... 235/489
4,827,140 A 5/1989 Mohan
4,882,961 A * 11/1989 Zabinski et al. .............. 83/177
4,901,359 A * 2/1990 Bruder .................. 235/462.01
4,941,183 A 7/1990 Bruder et al.

(List continued on next page.)

*Primary Examiner*—Boyer D. Ashley
(74) *Attorney, Agent, or Firm*—Jansson, Shupe & Munger, Ltd.

(57) ABSTRACT

An improved method and apparatus for cutting graphics areas from a sheet of material bearing a combination of graphics areas and a plurality of registration marks in predetermined positions with respect thereto, the combination being in a predetermined approximate position and orientation with respect to a set of reference features of the sheet. The method involves automatically determining whether the reference features are in an expected coordinate region on a sheet-receiving surface, and, if not, automatically determining the coordinate region of such features. Further steps then include sensing metrics of the reference features to determine the position and orientation of the sheet, inferring therefrom the approximate positions of the registration marks and then sensing the precise positions thereof with a main sensor, and cutting the graphics areas from the sheet in response to such precise positions.

22 Claims, 6 Drawing Sheets

U.S. PATENT DOCUMENTS 5,074,178 A 12/1991 Shetley et al.
5,201,351 A 4/1993 Hurdle, Jr.
5,212,647 A 5/1993 Raney et al.
5,258,917 A 11/1993 Bruder et al.
5,333,111 A * 7/1994 Chaiken et al. ............ 382/111
5,537,135 A 7/1996 Hevenor et al.
5,551,786 A 9/1996 Webster et al.
5,644,979 A 7/1997 Raney
5,727,433 A 3/1998 Pomerleau et al.
5,794,526 A * 8/1998 Raney .................... 100/229 R
5,838,569 A * 11/1998 Gane .......................... 700/134
5,937,725 A * 8/1999 Kamijo et al. ................. 83/56
6,112,630 A 9/2000 Miura
6,192,777 B1 2/2001 Williams et al.
6,205,370 B1 3/2001 Blaimschein et al.

* cited by examiner

METHOD AND APPARATUS FOR RAPID PRECISION CUTTING OF GRAPHICS AREAS FROM SHEETS

RELATED APPLICATIONS

This is a continuation-in-part of co-pending patent application Ser. No. 09/951,167, filed Sep. 13, 2001, entitled "Improved Method and Apparatus for Automatic Precision Cutting of Graphics Area from Sheets," which in turn is a continuation-in-part of co-pending patent application Ser. No. 09/827,000, filed Apr. 5, 2001, entitled "Improved Method and Apparatus for Precision Cutting of Graphics Areas from Sheets."

FIELD OF THE INVENTION

This invention is related generally to the field of cutting of graphics areas or the like from sheets for various purposes, and other narrow-path-processing with respect to graphics areas on sheets.

BACKGROUND OF THE INVENTION

The technical field involving the cutting of graphic areas from sheets, or otherwise doing narrow-path-processing with respect to graphics images on sheets, includes, for example, the face-cutting of laminate sheets to form decals. More specifically, a graphics image area on the face layer of a laminate needs to be cut away from the remainder of the face layer so that the graphics area (decal) can subsequently be pulled away from the backing layer of the laminate and be applied elsewhere as intended. Highly accurate face-layer cutting about the graphics is obviously highly desirable.

This is but one example in which highly accurate sheet cutting (or other processing) is desirable. In many other situations, highly accurate sheet cutting which is desired may not involve face-cutting, but through-cutting, in which the full thickness of the sheet is cut about a graphics area on the sheet. And in many situations, rather than highly accurate cutting, highly accurate scoring, creasing, line embossing or the like, in each case, of course, along a line the varying direction of which is determined by the shape of the graphics area. Together these types of operations on sheets with respect to graphics areas thereon are referred to herein for convenience as "narrow-path-processing." For convenience, the prior art problems and the invention herein which solves such problems will be discussed primarily with reference to sheet-cutting apparatus.

A method and associated apparatus which addresses many of the problems encountered in such processing of sheet material is the i-cut™ vision cutting system from Mikkelsen Graphic Engineering of Lake Geneva, Wis., and is the subject of U.S. patent application Ser. No. 09/678,594, filed on Oct. 4, 2000, and U.S. patent application Ser. No. 09/827,000, filed on Apr. 5, 2001, and U.S. patent application Ser. No. 09/951,167, filed on Sep. 13, 2001.

The invention described in Ser. No. 09/678,594 is a method and apparatus for achieving highly improved accuracy in cutting around graphics areas in order to fully adjust for two-dimensional distortion in the sheets from which the graphics areas will be cut, including distortion of differing degrees in different directions on the sheet of material. The distortion may be from the printing process or from some other post-printing process such as material handling or during the cutting process itself This invention also provides improved speed and accuracy in narrow-path-processing and greater efficiency of material usage.

The invention described in Ser. No. 09/827,000 is a method and apparatus for automatically and rapidly determining the position and orientation of a sheet of material on a work surface. When the placement of the sheet of material is not precisely controlled, the speed of the cutting or other narrow-path-processing system is often impaired because the system may require manual intervention to adjust the placement of the sheet of material so that the system can begin processing. Thus, the invention described in such patent disclosure provides further improved speed over the invention described in the first-mentioned patent disclosure.

The invention described in Ser. No. 09/951,167 is a method and apparatus which further improves the speed and efficiency of narrow-path-processing by automatically correcting for careless initial manual placement or malfunctioning automatic placement of a sheet of material on a work surface. The invention automatically and rapidly finds a set of special marks used for determination of the position and orientation of the sheet of material, eliminating the need for yet another possible manual intervention step.

In some cases, such as in the i-cut™ system from Mikkelsen Graphic Engineering, a flatbed plotter is used. These are devices having a positionally-controlled cutting implement above a flat work surface on which the sheet to be cut rests. The cutting implements are controlled based on controller-supplied instructions based on the X-Y coordinates necessary to achieve cutting along the intended path, such as about the graphics area.

Achieving greater speed and overall efficiencies in cutting or other narrow-path-processing is a continuing challenge encountered in the field of graphics image processing. One measure of efficiency is the speed with which sheets are processed. A source of inefficiency is the length of time required by the system to begin the cutting process after the sheet of material on which graphics areas have been previously printed are placed on the work surface of the cutting apparatus, either manually or by automatic sheet-feeding equipment. In either of these set-up situations, the cutting apparatus must determine the position and orientation of the sheet on the work surface in order to proceed accurately with the cutting process. If the operator or automatic sheet-feeder places the sheet of material on the work surface such that it is outside of the area or region of alignment on the work surface which the cutting system expects to find the sheet, manual intervention may be necessary to adjust the placement of the sheet to within the required initial region in order for the process to continue beyond this initial set-up step. A further source of inefficiency is the time-consuming step which may be required to allow the system to determine the initial position and orientation of the sheet on the work surface.

Another measure of efficiency is the amount of material waste which is produced during narrow-path-processing. Depending on volumes of material processed and the cost of the material used, the amount of waste may be important to minimize in order to increase overall process efficiency.

Despite the significant advances represented by the i-cut™ system, further increases in efficiency (speed of operation and material usage) are highly desirable in automated cutting systems.

OBJECTS OF THE INVENTION

It is an object of this invention to provide an improved method and apparatus for precision cutting of graphics areas from sheets overcoming some of the problems and shortcomings of the prior art.

Another object of this invention is to provide an improved method and apparatus which increases the speed of cutting and other narrow-path-processing of sheet material.

Another object of this invention is to provide an improved method and apparatus which reduces material waste in cutting and other narrow-path-processing of sheet material.

Another object of this invention is to provide an improved method and apparatus which automate the cutting and other narrow-path-processing of sheet material as much as possible.

Another object of this invention is to provide a method and apparatus for reducing the time to determine sheet position and orientation in apparatus for precise cutting around graphics areas.

Still another object of this invention is to provide an improved method and apparatus for cutting and other narrow-path-processing with respect to graphics on sheet materials of various kinds.

These and other objects of the invention will be apparent from the following descriptions and from the drawings.

SUMMARY OF THE INVENTION

The instant invention overcomes the above-noted problems and shortcomings and satisfies the objects of the invention. The invention is an improved method and apparatus for cutting graphics areas from sheets, or other narrow-path-processing with respect to graphics images. Stated more broadly, the invention is an improved method and apparatus for narrow-path-processing with respect to graphics images on sheets, including by cutting, creasing, scoring or the like around such images. Of particular note is that the instant invention brings high speed and improved efficiency, including minimizing material waste and eliminating certain manual intervention, to the precision cutting of graphics images from sheets bearing such images, including without limitation in situations in which there has been distortion of various kinds in the sheets, including two-dimensional distortion.

The method of this invention is stated with respect to cutting at least one graphics area from a sheet of material bearing a combination of such graphics area(s) and a plurality of registration marks in predetermined positions with respect to the graphics area(s), such combination being in a predetermined approximate position and orientation with respect to a set of reference features of the sheet.

The method is of the type which includes (a) placing the sheet on a sheet-receiving surface, (b) sensing the precise positions of the marks with a main sensor, and (c) cutting the graphics area(s) from the sheet in response to such precise positions. The invention includes the addition of steps which automatically enable the process to proceed regardless of whether or not the sheet has been placed in an expected position and orientation on the sheet-receiving surface. These steps include determining whether the reference features are in an expected coordinate region on the sheet-receiving surface. If the reference features of the sheet are not in the expected coordinate region, the coordinate region of the reference features is automatically determined. Further additional steps include sensing the metrics of the reference features to determine the position and orientation of the sheet and inferring therefrom the approximate positions of the registration marks.

The coordinate region of the set reference features on the sheet-receiving surface is the area thereof which, when contained within the field of view of the main sensor, enables main-sensor sensing of the set with precision sufficient to determine the position and orientation of the sheet of material on the sheet-receiving surface such that the various registration marks can be automatically found to enable subsequent precision sensing thereof In certain preferred embodiments of the invention, automatically determining the coordinate region of the reference features includes moving the main sensor in a predetermined pattern surrounding the expected location of the set of reference features and stopping the movement of the main sensor when the coordinate region of the set is located within the field of view of the main sensor. In one such embodiment, movement of the main sensor is in the plane of the sheet-receiving surface. In another such embodiment, moving the main sensor includes rotating the main sensor such that the field of view changes.

In certain embodiments of the invention, the automatic determining step includes enlarging the field of view of the main sensor, thereby locating the coordinate region of the set of reference features within an enlarged field of view. The main sensor is then repositioned, including shrinking the field of view of the main sensor, such that the set is within the field of view of the main sensor. In one such embodiment, enlarging and shrinking the field of view of the main sensor is performed by zooming a lens of the main sensor. In another such embodiment, the enlarging and shrinking steps are performed by increasing and decreasing respectively the distance between the main sensor and the sheet-receiving surface.

In another embodiment of the invention, automatically determining the coordinate region of the reference features includes locating the reference features within the field of view of a secondary sensor.

In a preferred embodiment of the invention, automatically determining the coordinate region of the reference features includes sensing an edge of the sheet.

In a highly preferred embodiment of the invention, automatically determining the coordinate region of the reference features includes sensing an adjacent pair of edges of the sheet.

In another embodiment of the invention, automatically determining the coordinate region of the reference features includes sensing a predefined graphics feature of the sheet.

In another embodiment of the invention, automatically determining the coordinate region of the reference features includes sensing two predefined graphics features of the sheet.

The inventive apparatus is a device for cutting at least one graphics area from a sheet of material bearing a combination of such graphics area(s) and a plurality of registration marks in predetermined positions with respect to the graphics area(s). The combination is in a predetermined approximate position and orientation with respect to a set of reference features of the sheet. The device includes: a sheet-receiving surface; a main sensor; a cutter operatively connected to the sensor and movable about the sheet-receiving surface for cutting the graphics area(s) from the sheet of material in response to the precise positions of the marks sensed by the main sensor; a reference feature identifier which, if the reference features are not in an expected coordinate region on the sheet-receiving surface, automatically determines the coordinate region of the reference features, and which, when the coordinate region of the reference features is known, senses the metrics of the reference features in order to infer the approximate positions of the registration marks.

As used herein, the term "metrics," applied in characterizing a reference feature, refers to the numerical parameters which can be used by the device to describe the position and orientation of the reference feature and, in combination with other metrics of this and other reference features, can be used to infer the position and orientation of the sheet of material on the sheet-receiving surface. For example, a straight edge of a sheet of material defines a line which lies at an angle with respect to the coordinate system axes of the sheet-receiving surface. Such angle is one such "metric." The comer of a sheet defined by the intersection of two such edges defines a point within the coordinate system, and the x, y coordinates of the comer point are two more such "metrics." Other metrics might include, among other things, certain geometric descriptors of shapes, positions, and orientations of graphical images within the graphics area itself In highly preferred embodiments of the inventive apparatus, the reference feature identifier includes a controller with a set of locating instructions for moving the main sensor in a predetermined pattern surrounding the expected coordinate region of the reference features, and stopping the movement of the main sensor when the reference features are located within the field of view of the main sensor.

In certain preferred embodiments of the invention, the reference feature identifier includes a zoom lens on the main sensor and a controller with a set of locating instructions for (a) enlarging the field of view of the main sensor by zooming the lens, (b) locating the reference features within the enlarged field of view, (c) repositioning the main sensor in response to the locating step, and (d) shrinking the field of view of the main sensor by zooming the lens such that the reference features are within the field of view of the main sensor.

In another embodiment of the inventive apparatus, the reference feature identifier includes a main-sensor height adjustor and a controller with a set of locating instructions for (a) enlarging the field of view of the main sensor by increasing the distance of the main sensor from the sheet material, (b) locating the reference features within the enlarged field of view, (c) repositioning the main sensor in response to the locating step, and (d) shrinking the field of view of the main sensor by decreasing the distance of the main sensor from the sheet such that the reference features are within the field of view of the main sensor.

In certain embodiments of the invention, the reference feature identifier includes a secondary sensor with a field of view larger than the field of view of the main sensor and a controller with a set of locating instructions for (a) locating the reference features within the field of view of the secondary sensor, and (b) repositioning the main sensor in response to the locating step such that the reference features are within the field of view of the main sensor.

DETAILED DESCRIPTION OF PREFERRED EMBODIMENTS

Figure 1:
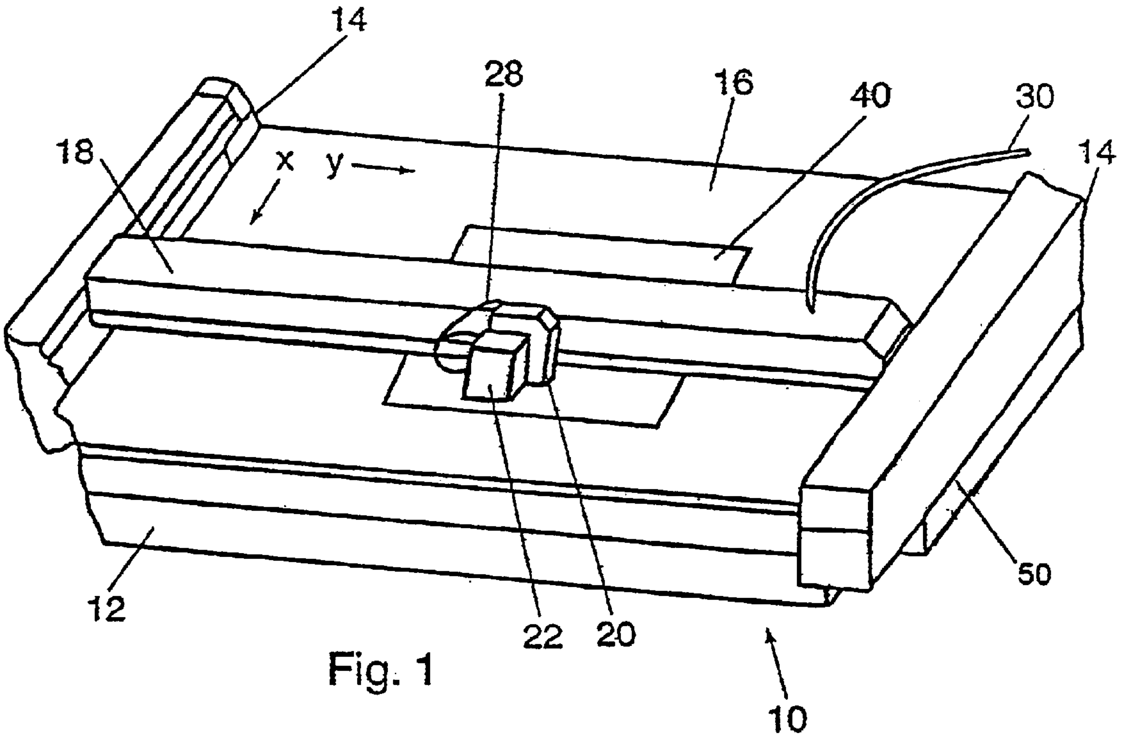
FIG. 1 is a perspective view of an automatically controlled cutting apparatus employing the present invention.

Referring to FIG. 1, a partially cutaway view of a cutting device is shown. Cutting device 10 has a housing 12 which may contain the controller 50 and a sheet-receiving surface 16. Cutting device 10, which is shown with a sheet 40 positioned on sheet-receiving surface 16, is also known as a flatbed plotter or cutter in the art, and may be a Zund plotter, manufactured by Zund System Technik HG, or a Wild plotter, to give two examples.

Cutting device 10 includes two longitudinal guide rails 14 mounted on housing 12 and a transverse member 18 suspended between longitudinal guide rails 14. Transverse member 18 is driven along guide rails 14 by a motor (not shown). A cutting tool 20, also driven by a motor (not shown), rides on transverse member 18. Cutting tool 20 has a cutting knife (not shown). Movement of cutting tool 20 over the sheet-receiving surface is performed by transverse member 18 moving back and forth along guide rails 14 and cutting tool 20 moving back and forth along transverse member 18.

A main sensor 22 is shown attached to cutting tool 20, although it is not necessary for it to be attached to it. Main sensor 22 may be an optical detector, such as a CCD camera which is known in the art, responsive to registration marks and other image objects on sheet 40 or features of sheet 40.

Figure 2:
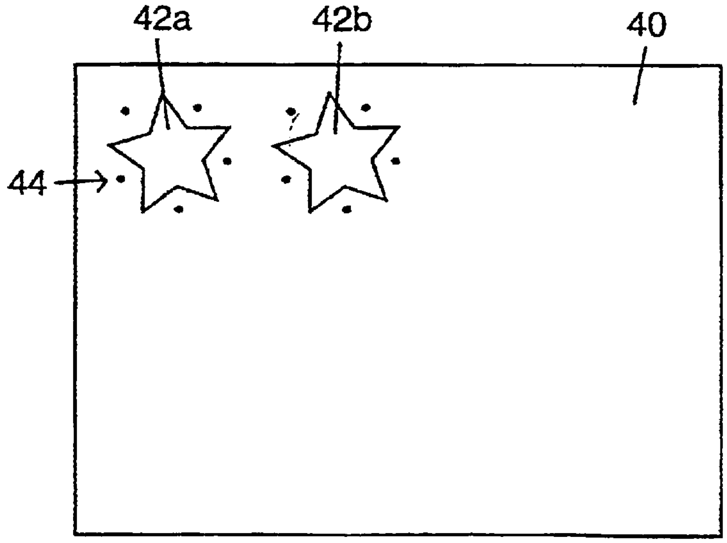
FIG. 2 is a top view of a sheet of sheet material with pre-printed graphics areas and registration marks.

Referring to FIG. 2, registration marks 44 are pre-printed on sheet 40. Sheet 40 has many registration marks 44 preprinted thereon, including several around each of the graphics areas 42*a* and 42*b* which are intended to be cut from sheet 40.

Figure 3:
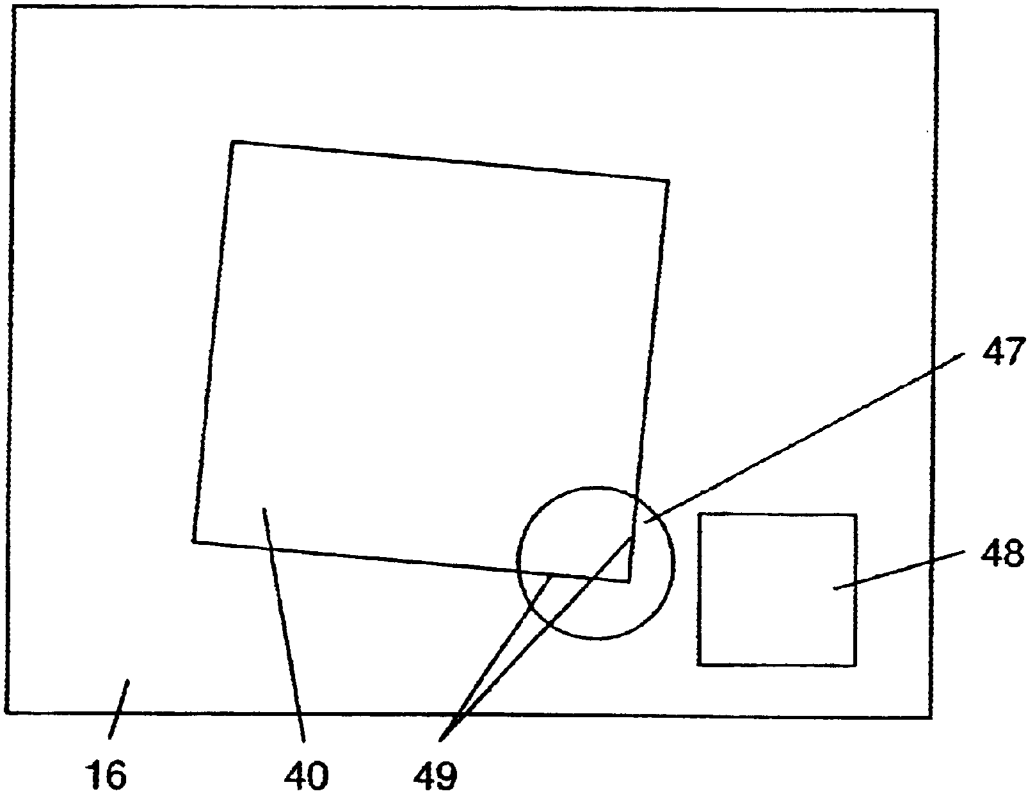
FIG. 3 is a top view of a sheet of material on a sheet-receiving surface, illustrating a coordinate region of a set of reference features and a field of view of a main sensor which does not contain the coordinate region of the set.

Referring to FIG. 3, sheet 40 is shown placed on sheet-receiving surface 16. A set of reference features 49 (shown as two edges at one corner of sheet 40) is within coordinate region 47 of sheet-receiving surface 16.

Referring back to FIG. 1, main sensor 22 is connected to the input of the controller, part of the reference feature identifier (not shown as a discrete element) by cables 28 and 30. The controller is also connected to and drives cutting tool 20. The controller receives the input external data and compares it to the format and content of information which it has stored in it. For each graphics area 42*a* and 42*b*, the information stored in the controller is the location of the perimeter of the graphics area relative to the locations of registration marks 44 as printed on sheet 40. Specifically, the controller has information defining the position of the registration marks 44 and the intended cutting paths, information defining the position of the registration marks 44 with respect to set of reference features 49, and information defining the expected location of set 49 on sheet-receiving surface 16.

After graphics areas 42*a* and 42*b* and registration marks 44 have been printed on sheet 40, sheet 40 is placed on sheet-receiving surface 16 at an initial position and orientation, illustrated in FIG. 3. When the controller instructs main sensor 22 to identify set 49 but set 49 is not found in the location expected by the controller, the controller instructs main sensor 22 to move in a predetermined pattern. The location expected by the controller is represented by initial field of view 48 of main sensor 22.

Figure 4A:
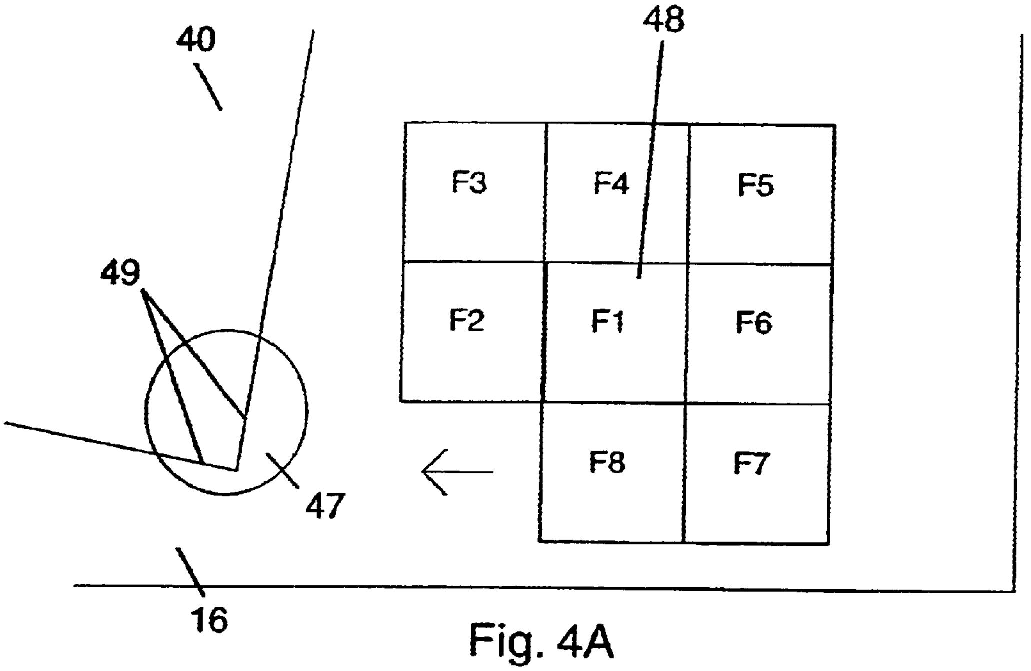
FIG. 4A is a top view of a portion of a sheet-receiving surface, a portion of a sheet of material, and one predetermined pattern of movement of the main sensor, illustrated by consecutive fields of view of the main sensor.
Figure 4B:
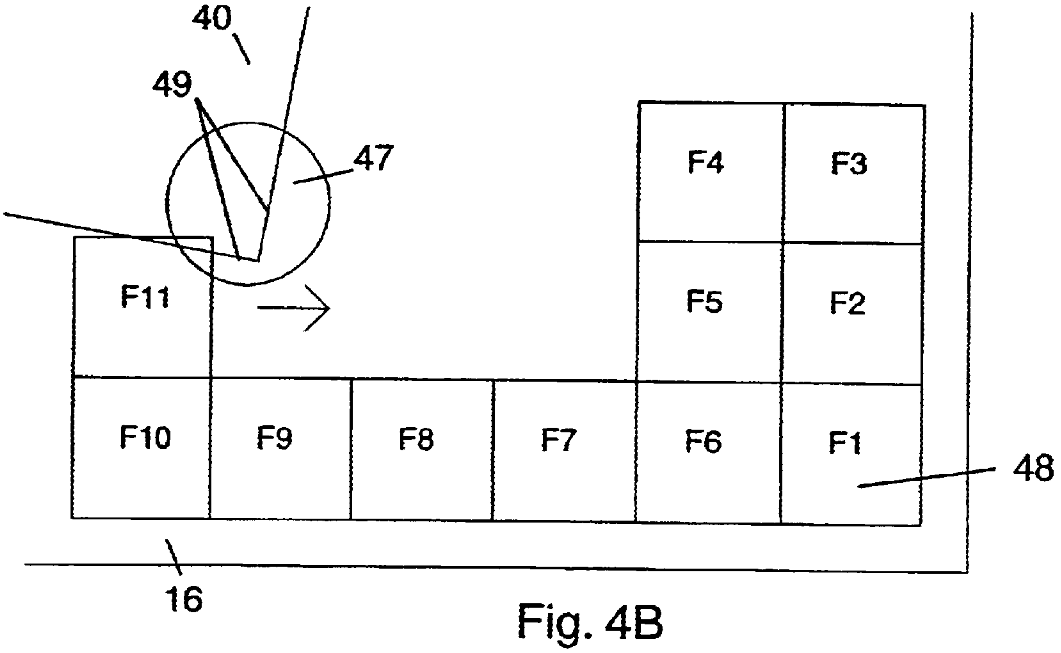
FIG. 4B is a top view of a portion of a sheet-receiving surface, a portion of a sheet of material, and a second predetermined pattern of movement of the main sensor, illustrated by consecutive fields of view of the main sensor.

FIGS. 4A and 4B illustrate two predetermined patterns along which main sensor 22 is directed to move by the controller of the reference feature identifier. In FIGS. 4A and 4B, one corner of sheet-receiving surface 16 is shown, along with one corner of sheet 40 containing set 49. In each of these figures, movement of main sensor 22 is illustrated by consecutive fields of view F1, F2, F3 . . . , etc., with initial field of view 48 (F1) aligning with the expected location of set 49. FIG. 4A illustrates a predetermined outwardly-expanding spiral pattern, and FIG. 4B illustrates a predetermined L-shaped pattern. These examples of predetermined patterns are but two of many patterns which can be used in the reference feature identifier to place coordinate region 47 of set 49 within the field of view of main sensor 22.

The metrics obtained by sensing set 49 are then used to determine the position and orientation of sheet 40 on work surface 16. Once the position and orientation of sheet 40 are known, the controller uses the stored information on the relative location of registration marks 44, in conjunction with main sensor 22, to determine the precise positions of registration marks 44.

While FIGS. 4A and 4B illustrate predetermined patterns made of a series of discrete fields of view, the patterns of this invention also contemplate continuous movement and continuous viewing by the reference feature identifier.

Figure 5:
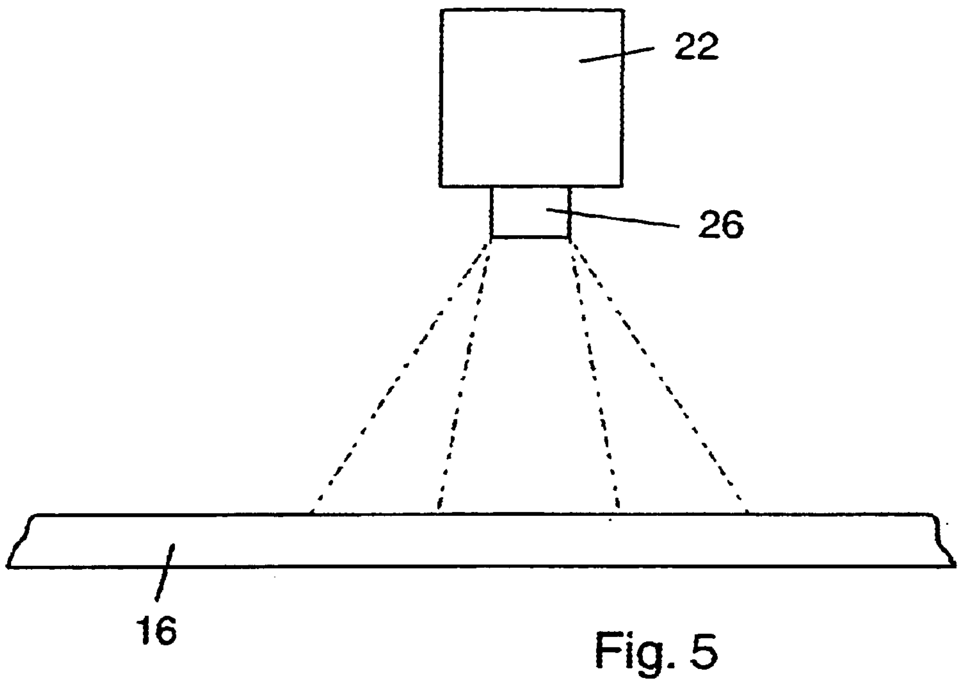
FIG. 5 is a schematic side view of sheet-receiving surface and a main sensor with a zoom lens.

FIG. 5 shows schematically another embodiment of the reference feature identifier. Main sensor 22 includes a zoom lens 26 which is used to enlarge the field of view of main sensor 22. When set 49 is not in an expected location, the controller of the reference feature identifier instructs the zoom lens to zoom out to enlarge the field of view and determines the position of set 49 in this enlarged field of view. Then, main sensor 22 is repositioned over sheet-receiving surface 16 such that coordinate region 47 of set 49 is centered within the field of view of main sensor 22, after which main sensor 22 zooms back in, shrinking its field of view in order to allow precise sensing of the metrics of set of reference features 49. Two alternative procedures include zooming main sensor 22 back in either before or during such repositioning; regardless of which procedure is programmed, coordinate region 47 of set 49 will end up within the shrunken field of view of main sensor 22.

Figure 6:
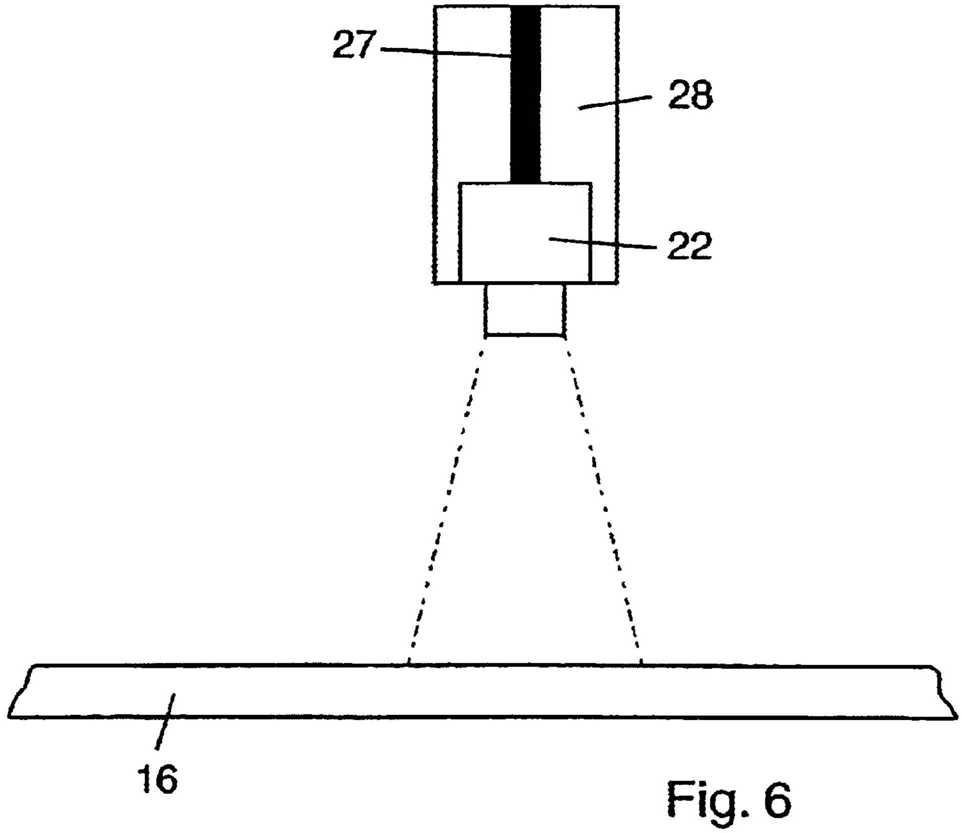
FIG. 6 is a schematic side view of a sheet-receiving surface with a main sensor height adjustor.

FIG. 6 shows schematically another embodiment of the reference feature identifier. Main sensor 22 is mounted on main-sensor height adjustor 28. Main sensor 22 is moved along track 27 by a motor (not shown) away from and toward sheet-receiving surface 16 to enlarge and shrink respectively the field of view of main sensor 22. When set 49 is not in an expected location, the controller of the reference feature identifier instructs main sensor 22 to move away from sheet-receiving surface 16, thereby enlarging the field of view of main sensor 22. The reference feature identifier then determines the position of set 49 and directs the repositioning of main sensor 22 over sheet-receiving surface 16. Then, main sensor 22 is moved back toward sheet-receiving surface 16 to shrink the field of view, such that coordinate region 47 of set 49 is within the field of view of main sensor 22.

Figure 7:
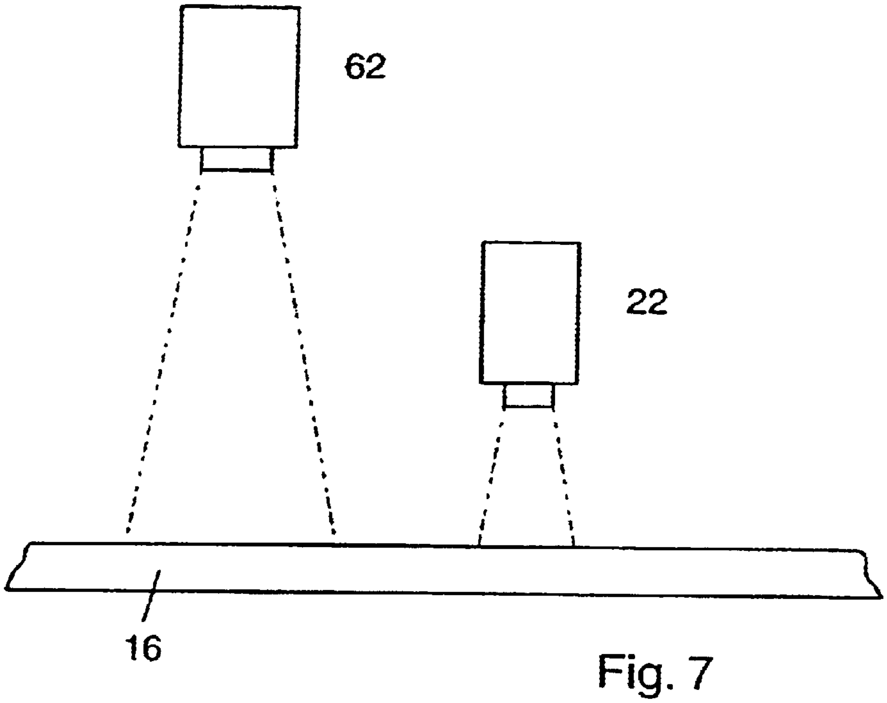
FIG. 7 is a schematic side view of a sheet-receiving surface with a main sensor and a secondary sensor.

FIG. 7 shows schematically a reference feature identifier which includes secondary sensor 62 which has a larger field of view than main sensor 22. Operation of the reference feature identifier in this embodiment is similar to the operation of the embodiment illustrated in FIG. 6, except that secondary sensor 62, the vertical position of which is fixed, takes the place of main sensor 22 in its raised position.

Figure 8:
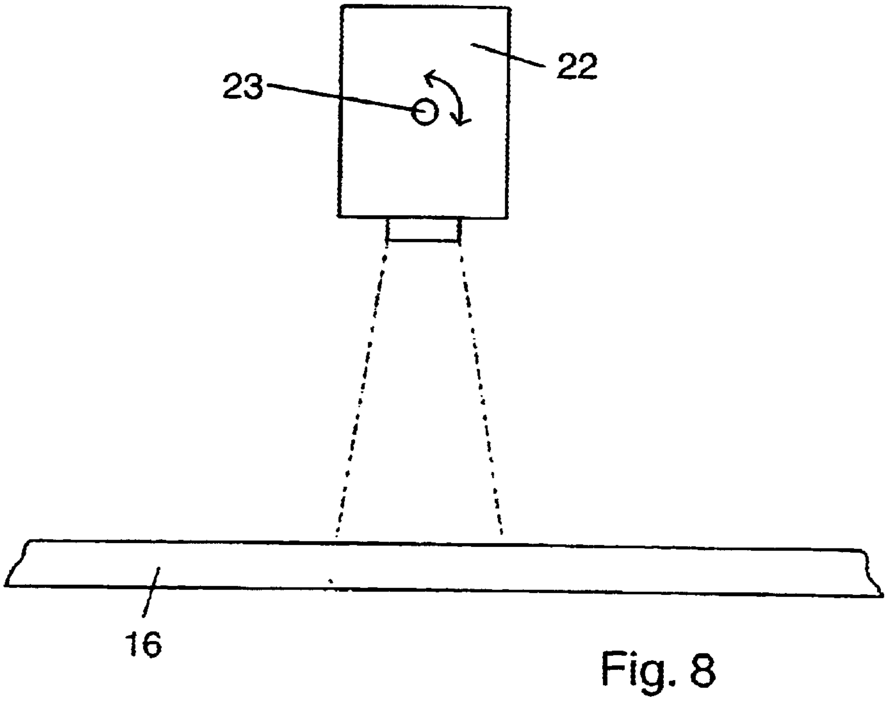
FIG. 8 is a schematic side view of a sheet-receiving surface with a main sensor which rotates to change its field of view.

FIG. 8 illustrates schematically a reference feature identifier which includes rotation around one of two axes parallel to the plane of sheet-receiving surface 16. Rotation about one such axis 23 is illustrated in FIG. 8. When set 46 is not in an expected location, the controller of the reference feature identifier instructs main sensor 22 to rotate in a manner which changes the field of view of main sensor 22, thereby allowing the reference feature identifier to find coordinate region 47 of set 49 outside of the initial field of view of main sensor 22. Main sensor 22 then determines the position of coordinate region 47 of set 49, is repositioned over sheet-receiving surface 16, and rotated back to a normal vertical orientation such that coordinate region 47 of set 49 is within the field of view-of main sensor 22.

Figure 9A:
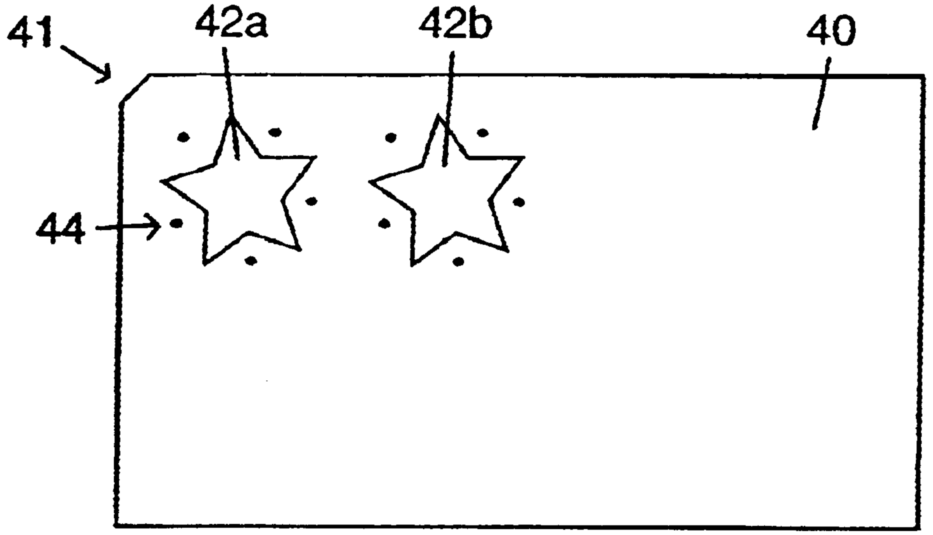
FIG. 9A is a top view of a sheet of material with pre-printed graphics areas and a set of reference features including a uniqueness feature comprising a comer cutoff.
Figure 9B:
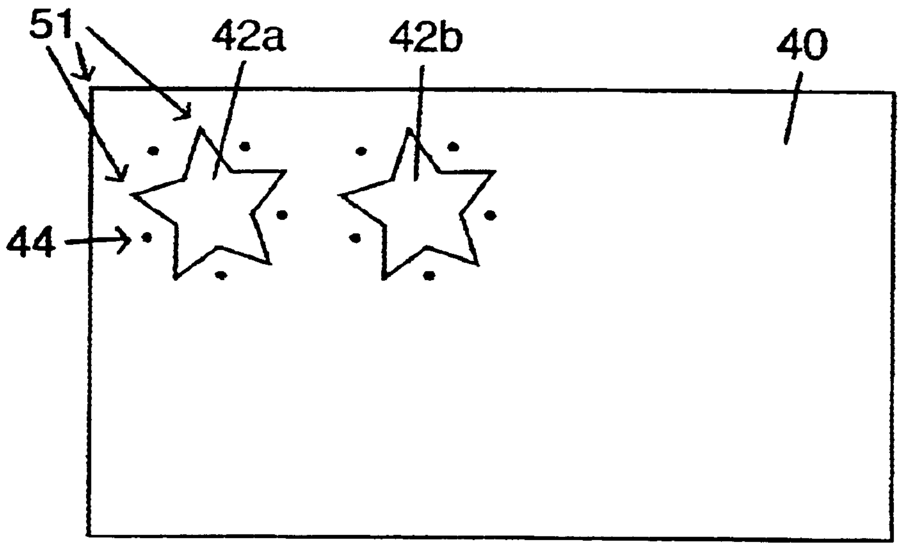
FIG. 9B is a top view of a sheet of material with pre-printed graphics areas, with a set of reference features including a portion of the graphics image near one corner of the sheet.

FIGS. 9A and 9B illustrate two additional types of reference feature sets which can be identified by the reference feature identifier. Shown in FIG. 9A is sheet 40 with graphics areas 42*a* and 42*b* thereon and reference feature set 41 at the upper left corner of sheet 40. Shown in FIG. 9B is sheet 40 with graphics areas 42*a* and 42*b* thereon and reference feature set 51 at the upper left corner of sheet 40.

FIG. 9A shows reference feature set 41 as a corner of sheet 40 which has a small section of the corner cut off. One group of metrics of set 41 includes the angle (with respect to the coordinate axes of surface 16, not shown) of the line defined by the edge of the cutoff corner and the two end points of the cutoff corner. If only one corner of sheet 40 has been cut off, then this group of metrics is adequate to uniquely determine position and orientation of sheet 40. Another group of metrics can include the angles of the cutoff edge and the two edges which meet the cutoff at its end points (all measured with respect to the coordinate axes of surface 16). In fact, there are numerous combinations of metrics which can be used based on such reference features. Further, if it can be assumed that the initial placement of sheet 40 on surface 16 is such that a particular corner is the corner nearest initial field of view 48 of sensor 22, then a smaller group of metrics is adequate for determining the position and orientation of sheet 40. In this way, the metrics of reference feature set 49 shown in FIGS. 3, 4A, and 4B can be the angle of the edges of set 49 with respect to a known line of surface 16 or the angle of one edge and the coordinates of the corner point.

FIG. 9B illustrates a different set 51 of reference features comprised of certain features of graphics area 42*a* and a corner of sheet 40. The group of metrics can be the coordinates of the three points indicated by the arrows from the number 51, one of which is the corner point itself. Just as in the description of set 41 in FIG. 9A, it will be apparent to those familiar with this invention that other groups of metrics of set 51 can be used to adequately determine the position and orientation of sheet 40 on surface 16.

As indicated above, the method and apparatus of this invention significantly speed the process of locating precise positions of registration marks 44 and improve the efficiency of the overall process, and these advantages are made possible regardless of presence or absence of distortion in sheet 40 occurring after the graphics image and registration marks are printed thereon. In operation, sensor 22 is caused to be positioned over a registration mark 44. Sensor 22 finds the mathematical center of a registration mark 44 and defines its position on work surface 16. Two other registration marks 44 are located and their centers are defined in like manner. These data are inputted to the controller where the actual locations of registration marks 44 on sheet 40 are compared to those of the registration marks in the predetermined cutting instructions—which are based on the pre-distortion positions of the graphics image(s) and registration marks 44. The predetermined cutting path is adjusted according to the actual (post-distortion) coordinates of registration marks 44. These comparisons are made interactively throughout the cutting process, making the process a dynamic process. The cutting path is adjusted according to the actual coordinates of the three registration marks 44 closest to a cutting point. When the cutting of an individual graphics area is completed, cutting tool 20 is caused to be lifted and moved to the next graphics area and the process is repeated.

The method and apparatus of this invention have a wide range of applications in a variety of industries. The invention also has application to sheets in the form of curved surfaces, in certain situations. Furthermore, the applicability of the invention is not limited to any particular kind or form of sheet.

While the principles of this invention have been described in connection with specific embodiments, it should be understood clearly that these descriptions are made only by way of example and are not intended to limit the scope of the invention.

What is claimed is:

1. In a method for cutting at least one graphics area from a sheet of material bearing a combination of such graphics area(s) and a plurality of registration marks in predetermined positions with respect to the graphics area(s), such combination being in a predetermined approximate position and orientation with respect to a set of reference features of the sheet of material, the method including (a) placing the sheet of material on a sheet-receiving surface, (b) sensing precise positions of the marks with a main sensor, and (c) cutting the graphics area(s) from the sheet of material in response to such precise positions, the improvement comprising:

automatically determining whether the reference features are in an expected coordinate region on the sheet-receiving surface;

if the reference features of the sheet of material are not in the expected coordinate region, automatically determining the coordinate region of the reference features on the sheet-receiving surface;

sensing metrics of the reference features to determine a position and orientation of the sheet of material; and inferring therefrom the approximate positions of the registration marks.

2. The method of claim 1 wherein automatically determining the coordinate region of the reference features includes locating the reference features within a field of view of a secondary sensor.

3. The method of claim 1 wherein automatically determining the coordinate region of the reference features includes sensing an edge of the sheet of material.

4. The method of claim 1 wherein automatically determining the coordinate region of the reference features includes sensing an adjacent pair of edges of the sheet of material.

5. The method of claim 1 wherein automatically determining the coordinate region of the reference features includes sensing a predefined graphics feature of the sheet of material.

6. The method of claim 1 wherein automatically determining the coordinate region of the reference features includes sensing two predefined graphics features of the sheet of material.

7.The method of claim 1 further including overcoming distortion in the sheet of material by, in association with the cutting, adjusting for distortion of differing degrees in different directions on the sheet of material.

8. The method of claim 1 wherein automatically determining the coordinate region of the reference features includes:

moving the main sensor in a predetermined pattern surrounding the expected coordinate region of the reference features; and stopping the movement of the main sensor when the reference features are within a field of view of the main sensor.

9. The method of claim 7 wherein the moving step includes rotating the main sensor such that the field of view changes.

10. The method of claim 1 wherein automatically determining the coordinate region of the reference features includes:

enlarging a field of view of the main sensor;

locating the reference features within the enlarged field of view; and shrinking the field of view of the main sensor such that the reference features are within the field of view of the main sensor.

11. The method of claim 10 wherein enlarging and shrinking the field of view of the main sensor includes zooming a lens of the main sensor.

12. The method of claim 10 wherein:

the enlarging step includes increasing the distance between the main sensor and the sheet of material; and the shrinking step includes decreasing the distance between the main sensor and the sheet of material.

13. In apparatus for cutting at least one graphics area from a sheet of material bearing a combination of such graphics area(s) and a plurality of registration marks in predetermined positions with respect to the graphics area(s), such combination being in a predetermined approximate position and orientation with respect to a set of reference features of the sheet of material, such apparatus including (a) a sheet-receiving surface, (b) a main sensor, (c) a cutter operatively connected to the sensor and adapted to move about the sheet-receiving surface to cut the graphics area(s) from the sheet of material in response to precise positions of the marks sensed by the main sensor, the improvement comprising; reference feature identifier means for automatically determining a coordinate region of the reference features if the reference features are not in an expected coordinate region on the sheet-receiving surface, and for sensing metrics of the reference features in order to infer the approximate positions of the registration marks when the coordinate region of the reference features is known.

14. The apparatus of claim 13 wherein the reference feature identifier means includes:

a zoom lens on the main sensor; and controller means for (a) enlarging a field of view of the main sensor by zooming the lens, (b) locating the reference features within the enlarged field of view, (c)

repositioning the main sensor in response to the locating step, and (d) shrinking the field of view of the main sensor by zooming the lens such that the reference features are within the field of view of the main sensor.

15. The apparatus of claim 13 wherein the reference feature identifier means includes:

a main-sensor height adjustor; and controller means for (a) enlarging the field of view of the main sensor by increasing the distance of the main sensor from the sheet of material, (b) locating the reference features within the enlarged field of view, (c) repositions the main sensor in response to the locating step, and (d) shrinking the field of view of the main sensor by decreasing the distance of the main sensor from the sheet of material such that the reference features are within the field of view of the main sensor.

16. The apparatus of claim 13 wherein the reference feature identifier means includes:

a secondary sensor with a field of view larger than the field of view of the main sensor, and controller means for (a) locating the reference features within a field of view of the secondary sensor, and (b) repositioning the main sensor in response to locating the reference features within the field of view of the secondary sensor such that the reference features are within the field of view of the main sensor.

17. The apparatus of claim 13 wherein the reference feature identifier means includes controller means for (a) moving the main sensor in a predetermined pattern surrounding the expected coordinate region of the reference features, and (b) stopping the movement of the main sensor when the reference features are located within the field of view of the main sensor.

18. The apparatus of claim 13 wherein the at least one graphics area is distored by differing degrees in different directions on the sheet of materials.

19. In a method for cutting at least one graphics area from a sheet of material bearing a combination of such graphics area(s) and a plurality of registration marks in predetermined positions with respect to the graphics area(s), such combination being in a predetermined approximate position and orientation with respect to a set of reference features of the sheet of material, the method including (a) placing the sheet of material on a sheet-receiving surface, (b) sensing precise positions of the marks with a main sensor, and (c) cutting the graphics area(s) from the sheet of material in response to such precise positions, the improvement comprising:

automatically determining whether the reference features are in an expected coordinate region on the sheet-receiving surface;

if the reference features of the sheet of material are not in the expected coordinate region, automatically determining the coordinate region of the reference features on the sheet-receiving surface;

sensing metrics of the reference features to determine a position and orientation of the sheet of material; and inferring therefrom the approximate positions of the registration marks, whereby cutting occurs precisely despite two-dimensional distortion of the sheet of material prior to cutting.

20. The method of claim 19 wherein the two-dimensional distortion is of differing degrees in different directions on the sheet of materials.

21. In a method for narrow-path-processing with respect to at least one graphics area on a sheet of material bearing a combination of such graphics area(s) and a plurality of registration marks in predetermined positions with respect to the graphics area(s), such combination being in a predetermined approximate position and orientation with respect to a set of reference features of the sheet of material, the method including (a) placing the sheet of material on a sheet-receiving surface, (b) sensing precise positions of the marks with a main sensor, and (c) narrow-path-processing with respect to the graphics area(s) in response to such precise positions, the improvement comprising:

automatically determining whether the reference features are in an expected coordinate region on the sheet-receiving surface;

if the reference features of the sheet of material are not in the expected coordinate region, automatically determining the coordinate region of the reference features on the sheet-receiving surface;

sensing metrics of the reference features to determine a position and orientation of the sheet of material; and inferring therefrom the approximate positions of the registration marks.

22. The method of claim 21 further including overcoming distortion in the sheet of material by, in association with the narrow-path-processing, adjusting for distortion of differing degrees in different directions on the sheet of material.

* * * * *

US006672187C1

(12) INTER PARTES REEXAMINATION CERTIFICATE (529th)
United States Patent
(10) Number: US 6,672,187 C1
(45) Certificate Issued: Feb. 15, 2013

Alsten et al.

(54) METHOD AND APPARATUS FOR RAPID PRECISION CUTTING OF GRAPHICS AREAS FROM SHEETS

(75) Inventors: Peter Alsten, Racine, WI (US); Geo Andersen, Aabyhoej (DK); David G. Jansson, Racine, WI (US)

(73) Assignee: Mikkelsen Graphic Engineering, Inc., Lake Geneva, WI (US)

Reexamination Request:
No. 95/001,354, May 14, 2010

Reexamination Certificate for:

| | |
|---|---|
| Patent No.: | **6,672,187** |
| Issued: | **Jan. 6, 2004** |
| Appl. No.: | **10/087,626** |
| Filed: | **Mar. 1, 2002** |

Related U.S. Application Data

(63) Continuation-in-part of application No. 09/951,167, filed on Sep. 13, 2001, now Pat. No. 6,619,168, which is a continuation-in-part of application No. 09/827,000, filed on Apr. 5, 2001, now Pat. No. 6,619,167.

(51) Int. Cl.
*B26D 5/00* (2006.01)
*G05B 15/00* (2006.01)

(52) U.S. Cl. .......... 83/13; 83/34; 83/39; 83/75; 83/76.8; 83/365; 83/368; 83/371; 700/134; 700/150; 700/167; 700/259; 347/157

(58) Field of Classification Search ...................... 83/13
See application file for complete search history.

(56) References Cited

To view the complete listing of prior art documents cited during the proceeding for Reexamination Control Number 95/001,354, please refer to the USPTO's public Patent Application Information Retrieval (PAIR) system under the Display References tab.

*Primary Examiner* — Glenn K. Dawson

(57) ABSTRACT

An improved method and apparatus for cutting graphics areas from a sheet of material bearing a combination of graphics areas and a plurality of registration marks in predetermined positions with respect thereto, the combination being in a predetermined approximate position and orientation with respect to a set of reference features of the sheet. The method involves automatically determining whether the reference features are in an expected coordinate region on a sheet-receiving surface, and, if not, automatically determining the coordinate region of such features. Further steps then include sensing metrics of the reference features to determine the position and orientation of the sheet, inferring therefrom the approximate positions of the registration marks and then sensing the precise positions thereof with a main sensor, and cutting the graphics areas from the sheet in response to such precise positions.

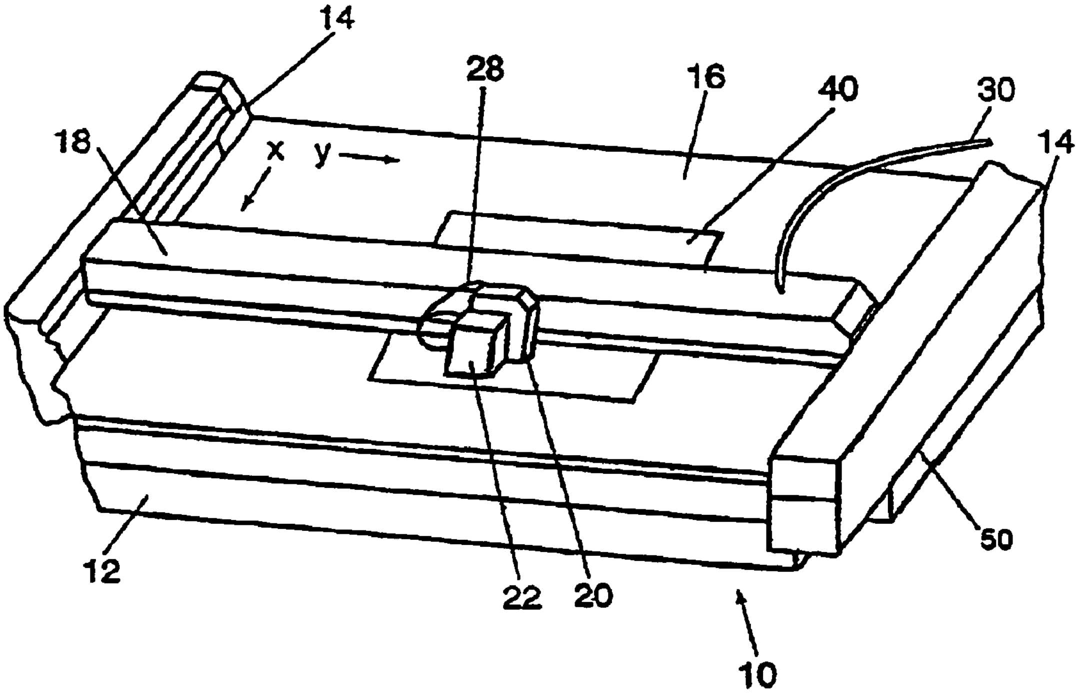

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

The patentability of claims 1, 3-8, 17 and 19-22 is confirmed.

Claims 13 and 18 are cancelled.

Claims 2, 9-12 and 14-16 were not reexamined.

* * * * *